Patented Mar. 15, 1932

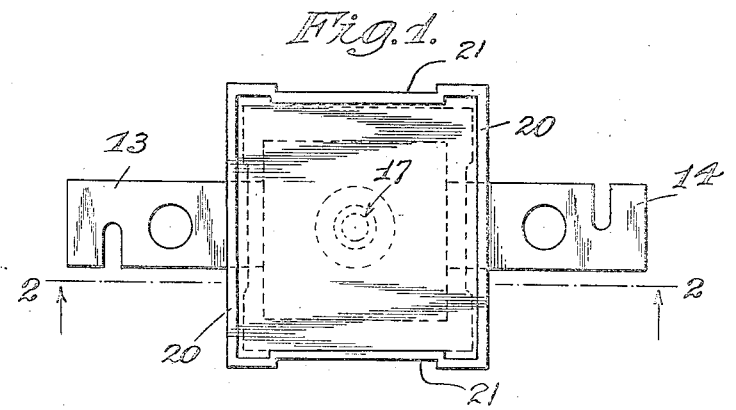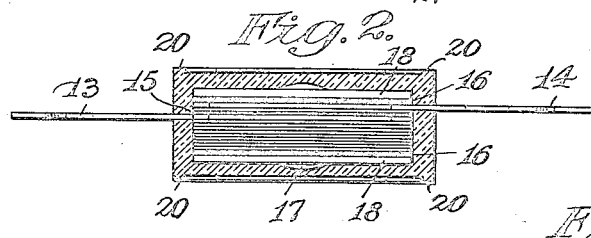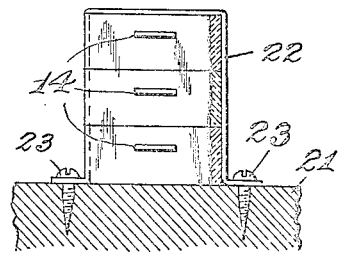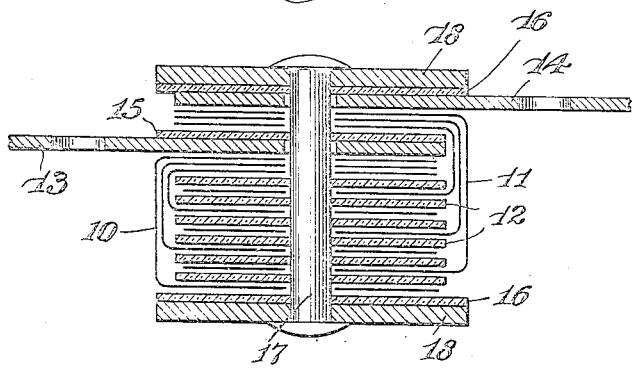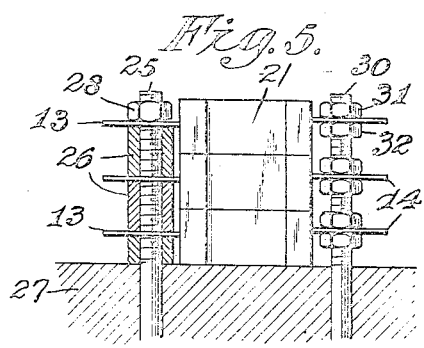

1,849,863

UNITED STATES PATENT OFFICE

WILLIAM M. BAILEY, OF LYNN, MASSACHUSETTS, ASSIGNOR, BY MESNE ASSIGNMENTS, TO GENERAL ELECTRIC COMPANY, A CORPORATION OF NEW YORK

ELECTRICAL CONDENSER

Application filed December 21, 1927. Serial No. 241,524.

This invention relates to electrical condensers, and more particularly to a stack condenser having a molded casing.

The invention provides for positively clamping a stack condenser having relatively small capacity and for subsequently encasing the condenser in a molded insulating material, such as a phenol condensation product. The condenser is adapted to be readily mounted by suitable clamping means and the terminals are so formed as to provide supports. The invention relates specifically to condensers having a small capacity, as for example, less than .1 m. f. although it is not limited to such sizes.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a top plan view of the condenser showing the molded casing;

Fig. 2 is a vertical section taken on the line 2—2 of Fig. 1 showing the condenser stack and terminals in elevation and the molded insulating material in section;

Fig. 3 is a conventional cross section of a condenser stack in expanded order;

Fig. 4 shows means for clamping several condensers together by means of a strap; and Fig. 5 shows a plurality of condensers mounted by means of their terminal strips.

Like reference characters denote like parts in the several figures of the drawings.

In the following description and in the claims parts will be identified by specific names for convenience, but they are intended to be as generic in their application to similar parts as the art will permit.

The condenser which is shown in the drawings as an example of one mode of applying this invention comprises (Fig. 3) a plurality of interleaved conducting foils 10 of one polarity and foils 11 of the opposite polarity separated by suitable spacing members 12. Leaves 10 are bent around the upper insulating member 12 into contact with terminal strip 13 and leaves 11 are similarly placed in contact with terminal strip 14. Insulating material 15 is inserted between leaves 11 and terminal 13 for preventing electrical contact therebetween. Pressure members 18 which may be formed of conducting material, if desired, and insulated from the condenser stack as by insulating strips 16, are securely clamped together by rivet 17 thereby forming a rigid assembly.

The stack may be built up by passing rivet 17 through pressure member 18 and insulator 16 and then alternately threading foils 10 and 11 and insulating strips 12 thereover. Foils 10 may then be bent up above the upper insulating strip 12 and terminal member 13 applied. Insulating strip 15 may then be positioned, foils 11 bent thereover and terminal 14 applied. The upper insulating strip 16 and pressure member 18 may then be placed in position and held under pressure while rivet 17 is headed for securing the assembly.

Terminals 13 and 14 are preferably formed of sufficiently heavy material to provide supporting means for the condenser as well as means for connecting the same in an external circuit. Foils 10 and 11 are provided with a hole of sufficient diameter to avoid contact with rivet 17 when they are inserted thereover. When the stack is rigidly clamped by said rivet the foils are securely held in position and are prevented from thereafter forming a contact with said rivet. Similarly, terminals 13 and 14 must have sufficient clearance around rivet 17 to prevent contact therewith.

After the condenser has been assembled and riveted together, as shown in Fig. 3, it is then surrounded by insulating material which is preferably molded thereabout to form a continuous external casing as shown in Figs. 1 and 2. The insulating material may comprise any convenient substance, such as phenol condensation product, which is capable of withstanding moisture as well as any mechanical stresses which may be applied thereto in commercial use. The molded material may be formed about the condenser stack in any convenient manner, and should be of sufficient thickness to completely cover the entire stack, including rivet 17. Terminals 13 and 14 will, however, extend from opposite sides of the unit and provide convenient supporting means therefor.

The molded casing is preferably formed with a peripheral ridge 20 which may be sufficiently flat to provide a contacting and supporting surface for the unit. This ridge is particularly advantageous in case a plurality of condensers are to be stacked as shown in Figs. 4 and 5.

In the arrangement shown in Fig. 4, a plurality of units are stacked and secured to a base member 27 as by strap 22 passing about said units and secured to said base member by screws 23. Terminals 13 and 14 project from opposite sides of the condenser at right angles to strap 22 and permit suitable external connections to be made.

A modified means for stacking the condenser units is shown in Fig. 5 which comprises a bolt 25 passing through suitable holes in terminal members 13 of each of said units. Spacing washers 26 are inserted between terminals 13 and allow the assembly to be securely clamped against base member 27 as by nut 28.

An alternative arrangement is shown at the right of Fig. 5, in which bolt 30 is passed through aligned holes in terminal members 14 and the various members clamped between nuts 31 and 32 threaded upon said bolt. This arrangement permits the various units to be spaced if desired, and divides the strain equally between each of the terminal members By means of the above described invention, a small sized condenser is produced in a convenient form for commercial application. The molded casing protects the active elements of the condenser from injury and prevents change in capacity which would otherwise occur due to absorbed moisture or displacement of the parts. Rivet 17 forms a positive holding means for securing the condenser elements irrespective of the molded casing and thereby prevents the compression forces from being relieved should the casing become cracked or damaged.

The metal rivet is capable of exerting a strong, positive compression upon the condenser elements which is not dependent upon any variations which may take place during the molding operation. The molding step itself is greatly simplified by the preliminary clamping rivet since the condenser may be handled as a unit and the casing molded thereabout without the use of pressure clamps.

The casing in addition to protecting the condenser itself forms a strengthening member for the terminals 13 and 14 and relieves any strain which might be placed upon the condenser stack by reason of the external forces applied to these terminals.

As shown in Figs. 1, 4 and 5 of the drawings, it will be seen that channels 21 are provided on opposite sides of the condensers so that the clamping strap 22 may be received and held within these channels.

A particular form of stack has been shown for purposes of illustration. It is obvious, however, that the invention is not limited to this type but may be applied to other forms well known in the art.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In an electrical condenser, a plurality of interleaved conducting and dielectric elements forming a stack, certain of said conducting elements being folded across on top of said stack, a terminal member in contact therewith, the other of said conducting elements being folded across said terminal member and insulated therefrom, a second terminal member in contact with said last mentioned elements, pressure plates associated with said stack and terminal members, means passing through said stack for applying transverse pressure thereto, and a molded insulating casing completely enclosing said stack.

2. In an electrical condenser, a plurality of interleaved conducting and dielectric elements forming a stack, certain of said conducting elements being folded across on top of said stack, a terminal member in contact therewith, the other of said conducting elements being folded across said terminal member and insulated therefrom, a second terminal member in contact with said last mentioned elements, means passing through said stack for applying transverse pressure thereto, and a molded insulating casing completely enclosing said stack.

3. In an electrical condenser, a plurality of interleaved conducting and dielectric elements forming a stack, certain of said conducting elements being folded across on top of said stack, a terminal member in contact therewith, the other of said conducting elements being folded across said terminal member and insulated therefrom, a second terminal member in contact with said last mentioned elements and extending diametrically opposite to said first mentioned terminal member, means passing through said stack for applying transverse pressure thereto, and a molded insulating casing completely enclosing said stack.

4. In an electrical condenser, a plurality of interleaved conducting and dielectric elements forming a stack, certain of said conducting elements being folded across on top of said stack, a terminal member in contact therewith, the other of said conducting elements being folded across said terminal member and insulated therefrom, a second terminal member in contact with said last mentioned elements, metallic pressure plates associated with said stack and terminal members, means passing through said stack for applying transverse pressure thereto, and a molded insulating casing completely enclosing said stack.

5. In an electrical condenser, a plurality of interleaved conducting and dielectric elements forming a stack, certain of said conducting elements being folded across on top of said stack, a terminal member in contact therewith, the other of said conducting elements being folded across said terminal member and insulated therefrom, a second terminal member in contact with said last mentioned elements, metallic pressure plates associated with said stack and terminal members, a rivet passing through said stack for applying transverse pressure thereto, and a molded insulating casing completely enclosing said stack.

6. In an electrical condenser, a plurality of interleaved conducting and dielectric elements forming a stack, certain of said conducting elements being folded across on top of said stack, a terminal member in contact therewith, the other of said conducting elements being folded across said terminal member and insulated therefrom, a second terminal member in contact with said last mentioned elements, pressure plates associated with said stack and terminal members, a rivet means passing through said stack for applying transverse pressure thereto, and a molded insulating casing completely enclosing said stack.

7. In an electrical condenser, a plurality of interleaved conducting and dielectric elements forming a stack, certain of said conducting elements being folded across on top of said stack, a terminal member in contact therewith, the other of said conducting elements being folded across said terminal member and insulated therefrom, a second terminal member in contact with said last mentioned element, said terminal members extending at opposite sides of said stack, pressure plates associated with said stack and terminal members, means passing through said stack for applying transverse pressure thereto, and a molded insulating casing having a flat contacting surface around said condenser.

8. An electrical condenser comprising a stack of dielectric and armatures, a molded plastic insulating material enclosing said stack and terminals projecting from the opposite sides of said condenser, said molded insulating material being provided on opposite sides between said terminals with channels substantially parallel to the stack axis to receive a member for clamping several of said condensers in a stack.

9. An electrical condenser comprising a stack of dielectrics and armatures, clamping means for said stack, a molded plastic insulating material enclosing said stack and clamping means, and terminals projecting from the opposite sides of said condenser, the outside of said molded insulating material being provided with channels for cooperation with means for clamping several of said condensers operatively together.

In testimony whereof I hereunto affix my signature.

WILLIAM M. BAILEY.